(12) United States Patent
Taoki

(10) Patent No.: US 10,462,346 B2
(45) Date of Patent: Oct. 29, 2019

(54) CONTROL APPARATUS, CONTROL METHOD, AND RECORDING MEDIUM

(71) Applicant: CANON KABUSHIKI KAISHA, Tokyo (JP)

(72) Inventor: Shinya Taoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/962,611

(22) Filed: Apr. 25, 2018

(65) Prior Publication Data

US 2018/0316842 A1 Nov. 1, 2018

(30) Foreign Application Priority Data

Apr. 28, 2017 (JP) .................. 2017-089719

(51) Int. Cl.
*H04N 5/232* (2006.01)
*G08B 13/196* (2006.01)

(52) U.S. Cl.
CPC ... *H04N 5/23203* (2013.01); *G08B 13/19689* (2013.01); *H04N 5/23222* (2013.01)

(58) Field of Classification Search
CPC .................. H04N 5/23203; H04N 5/23222
USPC ......................................... 348/143
See application file for complete search history.

(56) References Cited

U.S. PATENT DOCUMENTS 7,839,926 B1   11/2010  Metzger

FOREIGN PATENT DOCUMENTS

| DE | 69516092 T2 | 11/2000 |
| EP | 2851880 A1 | 3/2015 |
| JP | 2013-196423 A | 9/2013 |

*Primary Examiner* — Hee-Yong Kim
(74) *Attorney, Agent, or Firm* — Canon U.S.A., Inc. IP Division

(57) ABSTRACT

In a case where a definition condition defining a plurality of conditions including an image quality condition for defining image quality of a captured image captured by an imaging apparatus is specified, a determination unit determines whether predetermined processing according to a different image is being performed, the different image being different from an image corresponding to the definition condition and being generated by the imaging apparatus. In a case where the definition condition is specified, a control unit controls the imaging apparatus to generate an image not satisfying at least part of the conditions defined by the definition condition and satisfying the other condition(s) according to a result of determination by the determination unit.

19 Claims, 11 Drawing Sheets

FIG.4

| PRESET PARAMETERS | PRESENCE OF INFLUENCE ON OTHER STREAMS |
|---|---|
| IMAGE CLIPPING PARAMETER GROUP | — |
| IMAGE CLIPPING X COORDINATE | NO |
| IMAGE CLIPPING Y COORDINATE | NO |
| IMAGE CLIPPING SIZE | NO |
| IMAGE QUALITY PARAMETER GROUP | — |
| FOCUS VALUE | YES |
| EXPOSURE CORRECTION | YES |
| APERTURE | YES |
| IR CUT FILTER SWITCHING | YES |
| INFRARED LIGHTING | YES |
| SHUTTER SPEED | YES |

CONTROL APPARATUS, CONTROL METHOD, AND RECORDING MEDIUM

BACKGROUND OF THE INVENTION

Field of the Invention

The present invention relates to a control technique regarding an imaging apparatus.

Description of the Related Art

There has heretofore been a technique for remotely controlling a camera via a network or a remote controller. Surveillance camera systems using such a remote control technique have also been known. Image quality parameters of the camera, such as a focus, zoom, exposure, and white balance, can be changed by using the remote control technique.

There is a function of clipping and transmitting (distributing) a part of a captured image captured by a camera as a partial image. Such a camera can transmit a plurality of different partial images as respective streams or record the partial images in a storage.

Japanese Patent Application Laid-Open No. 2013-196423 discusses a technique for controlling an imaging apparatus. According to Japanese Patent Application Laid-Open No. 2013-196423, parameter control is performed on the imaging apparatus according to a detected motion area.

The technique discussed in Japanese Patent Application Laid-Open No. 2013-196423 does not take into consideration the case of transmitting or recording a plurality of moving images based on the same captured image. In other words, if one of the plurality of moving images based on the same captured image is changed in some way, the other moving image can be influenced.

SUMMARY OF THE INVENTION

The present invention is directed to reducing the possibility of influence on other images in a case where a change is made to one of a plurality of images which is based on the same captured image. A control apparatus thus includes, for example, the following configuration.

According to an aspect of the present invention, the control apparatus includes a determination unit configured, in a case where a definition condition defining a plurality of conditions including an image quality condition for defining image quality of a captured image captured by an imaging apparatus is specified, to determine whether predetermined processing according to a different image is being performed, the different image being different from an image corresponding to the definition condition and being generated by the imaging apparatus, and a control unit configured, in a case where the definition condition is specified, to control the imaging apparatus to generate an image not satisfying at least part of the conditions defined by the definition condition and satisfying the other condition(s) according to a result of determination by the determination unit.

Further features of the present invention will become apparent from the following description of exemplary embodiments with reference to the attached drawings.

BRIEF DESCRIPTION OF THE DRAWINGS

FIG. 4 is a diagram illustrating preset parameters according to the exemplary embodiments and presence of influence information on other streams.

DESCRIPTION OF THE EMBODIMENTS

Exemplary embodiments of the present invention will be described in detail below with reference to the accompanying drawings. Configurations described in the following exemplary embodiments are merely examples, and the present invention is not limited to the configurations described in the following exemplary embodiments. While each exemplary embodiment is described by using a surveillance camera including an imaging unit as an example, cameras other than ones for surveillance purposes are also applicable. For example, an exemplary embodiment of the present invention may be applied to an imaging unit that captures a video image or motion picture for broadcasting purposes or a video image for personal purposes, not for surveillance purposes.

Figure 1A:
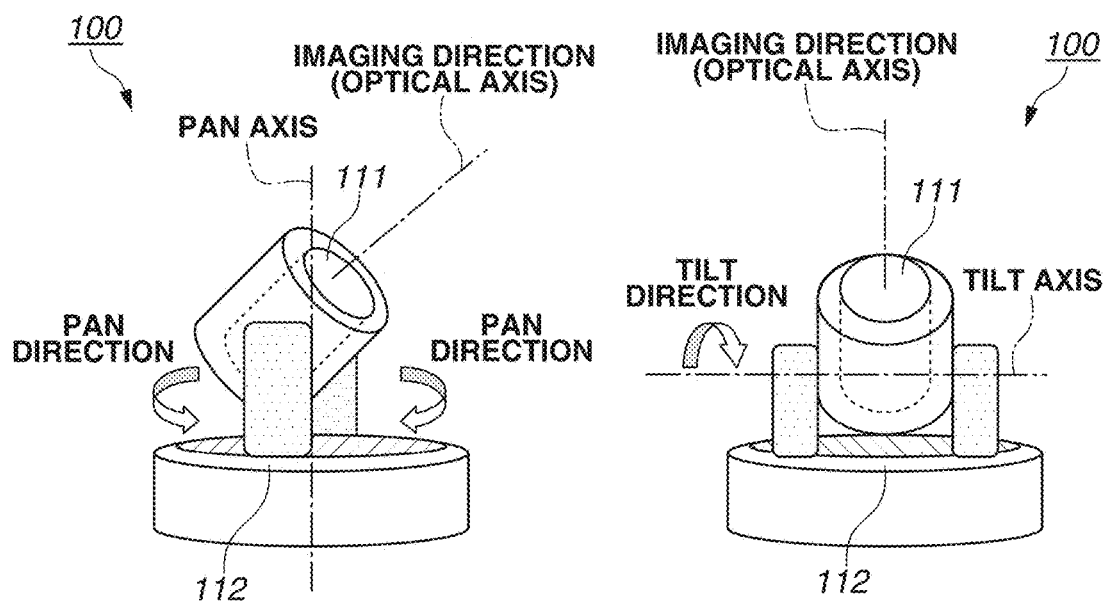
FIG. 1A is a diagram illustrating a surveillance camera according to exemplary embodiments.

A network configuration according to an exemplary embodiment of the present invention will be described with reference to FIGS. 1A and 1B.

A surveillance camera (imaging apparatus) 100 includes a casing 111 which includes a lens, and a pan-tilt (PT) driving unit 112 which moves an imaging direction in a pan direction and a tilt direction.

Figure 1B:
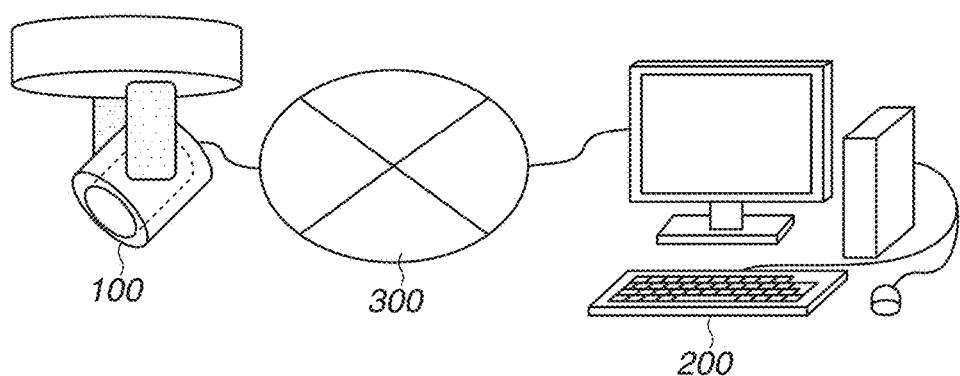
FIG. 1B is a network configuration diagram including the surveillance camera according to the exemplary embodiments.

FIG. 1B is a system configuration diagram including the surveillance camera 100. A client apparatus 200 and the surveillance camera 100 are connected in a state in which the client apparatus 200 and the surveillance camera 100 can mutually communicate with each other via a network 300. The client apparatus 200 transmits various commands for performing a PT control and a zoom control to the surveillance camera 100. The surveillance camera 100 performs operations corresponding to the commands, and transmits responses to the commands to the client apparatus 200. In each exemplary embodiment, the surveillance camera 100 can perform functions as a control apparatus. The client apparatus 200 can perform the functions as a control apparatus.

Figure 2:
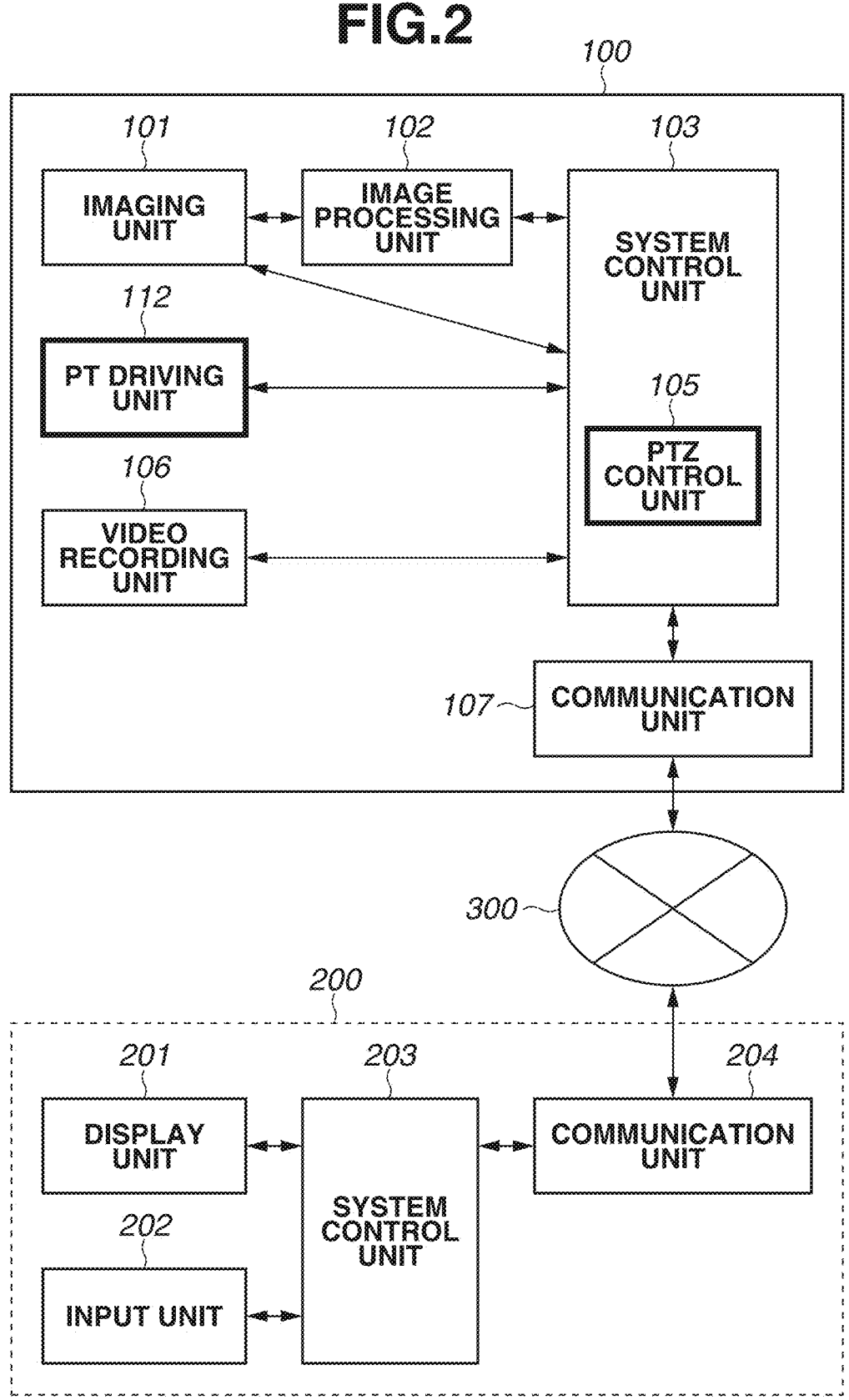
FIG. 2 illustrates a functional block diagram and a system configuration diagram of the surveillance camera and a client apparatus according to the exemplary embodiments.

FIG. 2 is a functional block diagram of the surveillance camera 100 and the client apparatus 200 according to the present exemplary embodiment. The surveillance camera 100 can capture an image based on light focused through a normal lens. The surveillance camera 100 may capture an image (fish-eye image) based on light focused through a fish-eye lens.

Components and functions of the surveillance camera 100 will be described with reference to FIG. 2. The surveillance camera 100 includes an imaging unit 101, an image processing unit 102, a system control unit (control apparatus) 103, the PT driving unit 112, a pan-tilt-zoom (PTZ) control unit 105, a video recording unit 106, and a communication unit 107.

The imaging unit 101 receives light focused through the lens by an image sensor, and converts the received light into electrical charges to generate an imaging signal. For example, a complementary metal-oxide-semiconductor (CMOS) image sensor can be used as the image sensor. A charge-coupled device (CCD) image sensor also can be used as the image sensor. The system control unit (control apparatus) 103 can be provided inside the surveillance camera 100. The system control unit 103 can be configured independently of the surveillance camera 100. If the system control unit 103 is an apparatus external to the surveillance camera 100, the system control unit 103 and the surveillance camera 100 can be configured to be communicable with each other.

The image processing unit 102 digitizes the imaging signal converted by the imaging unit 101 to generate image data. The image processing unit 102 here also performs various types of image processing for correcting image quality. The image processing unit 102 can further compress and encode the image data to generate compressed and encoded image data.

The communication unit 107 transmits a video stream based on the image data generated by the image processing unit 102 to the client apparatus 200. An example of the image data here is image data on a moving image. The communication unit 107 receives a command transmitted from the client apparatus 200, and conveys the command to the system control unit 103. The communication unit 107 transmits a response to the command to the client apparatus 200 according to the control of the system control unit 103. In such a manner, the system control unit 103 also functions as a communication control unit.

The system control unit 103 of the surveillance camera 100 analyzes the command received by the communication unit 107 and performs processing according to the command. The system control unit 103 comprises a determination means and a control means. The determination means is configured, in a case where a definition condition defining a plurality of conditions including an image quality condition for defining image quality of a captured image captured by an imaging apparatus is specified, to determine whether predetermined processing according to a different image is being performed, the different image being different from an image corresponding to the definition condition and being generated by the imaging apparatus. The control means is configured, in a case where the definition condition is specified, to control the imaging apparatus to generate an image not satisfying at least part of the conditions defined by the definition condition and satisfying the other condition(s) according to a result of determination by the determination means.

For example, the system control unit 103 makes the image processing unit 102 perform an image quality adjustment according to the command. The PTZ control unit 105 in the system control unit 103 controls the imaging unit 101 and the PT driving unit 112 to change the imaging direction and an angle of view.

The PT driving unit 112 includes a driving system for moving the imaging direction and a motor serving as a driving source of the driving system. An operation of the PT driving unit 112 is controlled by the PTZ control unit 105.

The video recording unit 106 records image data in an internal storage and an external storage. Examples of such storages include a hard disk drive (HDD) and a flash memory.

Next, components and functions of the client apparatus 200 will be described with reference to FIG. 2.

The client apparatus 200 can be implemented by using a computer such as a personal computer.

A display unit 201 displays a video image based on image data received from the surveillance camera 100, and a graphic user interface (GUI) for performing a camera control. The display unit 201 can be implemented by a display device using a liquid crystal panel or an organic electroluminescence (EL) panel. The display unit 201 provides a display according to the control of a system control unit 203.

An input unit 202 can be implemented by a device such as a keyboard and a mouse. The user of the client apparatus 200 operates the GUI via the input unit 202. The input unit 202 can be implemented by using a touch panel.

The system control unit (control apparatus) 203 of the client apparatus 200 generates a command according to the user's operation, and transmits the command from a communication unit 204 to the surveillance camera 100. The system control unit 203 displays the image data from the surveillance camera 100, received via the communication unit 204, on the display unit 201. In such a manner, the system control unit 203 also functions as a communication control unit and a display control unit.

The client apparatus 200 can thus obtain image data from the surveillance camera 100 via the network 300. The client apparatus 200 can control the surveillance camera 100 by transmitting a command via the network 300.

Figure 3:
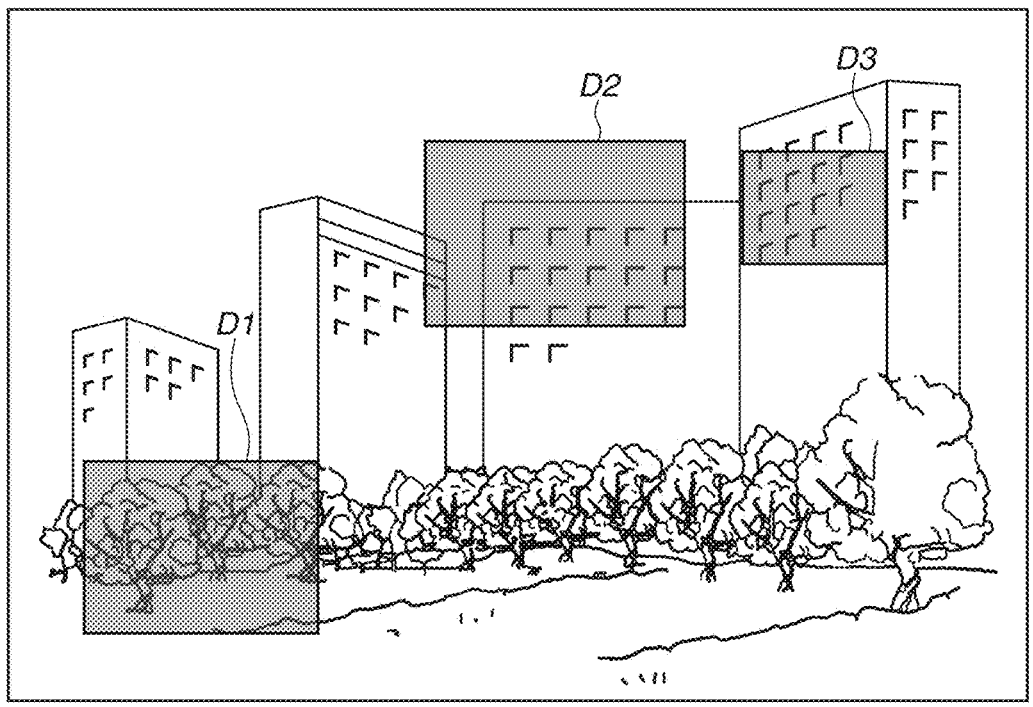
FIG. 3 is a diagram illustrating an example of image clipping by the surveillance camera according to the exemplary embodiments.

FIG. 3 is a diagram illustrating an example of image clipping by the surveillance camera 100 according to the present exemplary embodiment. In each exemplary embodiment, a partial image (clipped image) refers to an image corresponding to a part of a captured image. Various methods can be used to obtain a partial image from a captured image. For example, a partial image can be obtained by controlling reading of data from the image sensor. Alternatively, after generation of image data, a partial image can be generated from the generated image data. A partial image is thus an image corresponding to a partial area in a captured image.

Images of a plurality of different partial areas, like areas D1, D2, and D3 in FIG. 3, can be simultaneously clipped and transmitted. The images of the plurality of different partial areas can be simultaneously recorded in a storage. The image before clipping (image to be clipped) can also be transmitted and recorded. The images of the plurality of different partial areas and the image to be clipped can be simultaneously transmitted and recorded. The image to be clipped can be an image captured by the imaging unit 101, or an image of an area of the image captured by the imaging unit 101 excluding peripheral portions.

In the following description, streams include, for the convenience of description, image data that is recorded in a storage without being transmitted. The term stream shall cover both a stream of a partial image and a stream of an image to be clipped.

FIG. 4 is a chart illustrating preset parameters (definition condition) about a preset function of the surveillance camera 100 according to the exemplary embodiment of the present invention, and presence of influence information on other streams.

For example, the preset function is a function of storing relative positions of partial images with respect to an image to be clipped, and if specific preset parameters 401 are specified by the user, transmitting an image at the position (area) defined by the preset parameters 401. The preset function can define image quality parameters for controlling image quality.

If preset parameters 401 are specified by the user, the system control unit 203 of the client apparatus 200 transmits, to the surveillance camera 100, a command to output or record an image at the position and with the image quality defined by the specified preset parameters.

The system control unit 103 of the surveillance camera 100 transmits a stream of the image with the image quality and at the position defined by the received command to the client apparatus 200.

Aside from the specification by the user, the preset function can be specified by scheduling to transmit a stream defined by the preset parameters at predetermined time.

Preset parameters 401 include an image clipping parameter group (position condition) 403 and an image quality parameter group (image quality condition) 404. Such parameters can be set for each set of preset parameters.

A table 400 is a diagram illustrating an example of presence of influence 402 on other streams with respect to each parameter included in the preset parameters 401. A plurality of conditions comprises the image clipping parameter group (position condition) 403 and the image quality parameter group (image quality condition) 404. The imaging apparatus is controlled to generate an image not satisfying the at least part of the conditions defined by the definition condition. The imaging apparatus is controlled to generate an image satisfying the other condition(s). The phrase "at least a part of the conditions" refers to some selected conditions of the plurality of conditions. The phrase "other condition(s)" refers to the remaining conditions of the plurality of conditions. For example, the "at least a part of the conditions" correspond to the image clipping parameter group (position condition) 403, while the "other condition(s)" correspond to the image quality parameter group (image quality condition) 404.

The image clipping parameter group 403 is a condition for defining the position of a partial image in a captured image. For example, the position of the partial image is defined by a pixel-based coordinate position with the top left of the captured image as an origin. The image clipping parameter group 403 is applied to only the video image of the stream in question, and has no influence on other stream video images.

The image quality parameter group 404 is a condition for defining the image quality of the captured image. The image quality parameter group 404 is changed with respect to the captured image (image to be clipped), and is not capable of being set with respect to each stream video image of a partial video image. The image quality parameter group 404 can thus influence other stream video images.

For example, the image quality parameter group 404 includes parameters for adjusting a focus, an exposure correction, an aperture, a shutter speed, and zooming of the imaging unit 101 and the image processing unit 102. For example, the image quality parameter group 404 includes parameters indicating whether to use an infrared (IR) cut filter and infrared lighting. The image quality parameter group 404 can further include a parameter for specifying a PTZ position. Any parameter affecting the image to be clipped may be included.

As described above, the preset parameters 401 include the image clipping parameter group 403 and the image quality parameter group 404, and serve as a definition condition for defining the position and image quality of the partial image.

The user can specify a plurality of preset parameters 401 of different contents in the client apparatus 200. The plurality of preset parameters 401 can include preset parameters including only parameters that do not affect the captured image (for example, image clipping parameter group). The plurality of preset parameters 401 can include preset parameters including only parameters that affect the captured image (for example, image quality parameter group).

The values of the preset parameters 401 may be specified by the user, or stored in the surveillance camera 100 or the client apparatus 200 in advance.

Images at different positions can be simultaneously clipped from the same image (image to be clipped) and transmitted as streams. The preset function for changing an image clipping position and image quality parameters can be performed on each stream.

Figure 5:
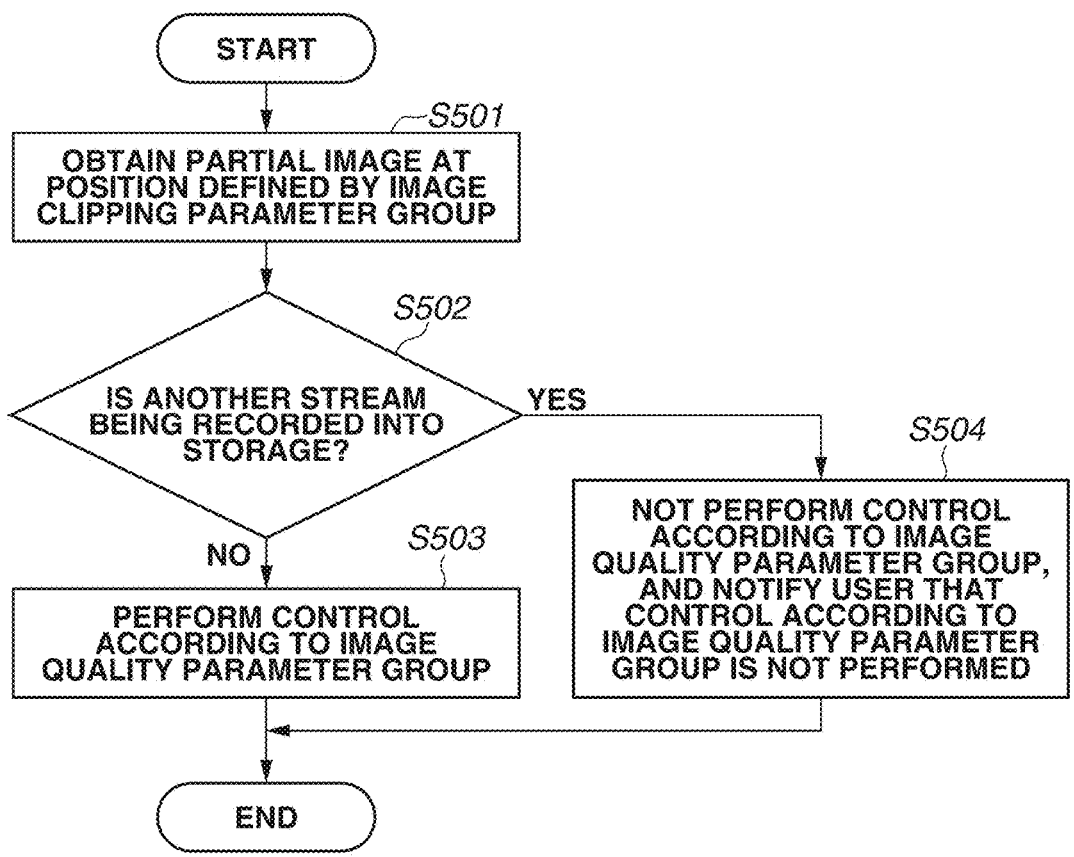
FIG. 5 is a flowchart during execution of a preset function according to a first exemplary embodiment.

Next, a processing procedure during execution of the preset function according to the exemplary embodiment of the present invention will be described with reference to FIG. 5. As an example, a processing procedure when certain preset parameters 401 are specified by operation of the input unit 202 and an execution command for the preset parameters 401 is transmitted from the client apparatus 200 to the surveillance camera 100 will be described. The flowchart illustrated in FIG. 5 can be performed by the system control unit 203 of the client apparatus 200. In such a case, the system control unit 203 is triggered to perform the flowchart illustrated in FIG. 5 when the user gives an execution instruction for specific preset parameters 401. The same applies to the other exemplary embodiments.

In step S501, when the command is received by the communication unit 107, the system control unit 103 performs control corresponding to the image clipping parameter group 403 of the specified preset parameters 401 on the imaging unit 101 and the image processing unit 102. Specifically, the system control unit 103 obtains a partial image at the position defined by the image clipping parameter group 403. The system control unit 103 records the obtained partial image in the video recording unit 106 or outputs (transmits) the obtained partial image to the client apparatus 200 via the communication unit 107. The system control unit 103 can both record and output the obtained partial image. Since merely obtaining the partial image has no influence on other streams, the control can be performed regardless of a transmission or recording status of the other streams. In other words, the system control unit 103 can perform the control without determining the transmission or recording status of the other streams.

In step S502, the system control unit 103 determines the recording status of the stream by the video recording unit 106. The system control unit 103 then determines whether another stream is currently being recorded into the internal or external storage. Another stream here refers to the stream of a partial image included in the same captured image (image to be clipped) as the preset parameter-specified stream is. Another stream can be the stream of the image to be clipped.

In a case where no other stream is being recorded into the internal or external storage (NO in step S502), the processing proceeds to step S503. In a case where another stream is being recorded into the internal or external storage (YES in step S502), the processing proceeds to step S504.

In step S503, the system control unit 103 performs control corresponding to the image quality parameter group 404 of the preset parameters 401. Specifically, the system control unit 103 makes the imaging unit 101 and the image processing unit 102 generate a captured image under the condition defined by the image quality parameter group 404. For example, the system control unit 103 changes the processing of the imaging unit 101 and the image processing unit 102 to achieve the parameter values defined by the image quality parameter group 404. The flowchart illustrated in FIG. 5 can be performed by the system control unit 203 of the client apparatus 200. In such a case, in step S503, the system control unit 203 controls the surveillance camera 100 to perform control according to the image clipping parameter group 403 and the image quality parameter group 404. Specifically, at the stage of step S503, the system control unit 203 transmits a command to perform control according to the image clipping parameter group 403 and the image quality parameter group 404 to the surveillance camera 100 from the communication unit 204. The same applies to the other exemplary embodiments.

In step S504, the system control unit 103 does not perform the control according to the image quality parameter group 404 of the preset parameters 401. The system control unit 103 then transmits information indicating that the control according to the image quality parameter group 404 is not performed from the communication unit 107 to the client apparatus 200 for the sake of notification to the user who has specified the preset parameters 401. If the system control unit 203 of the client apparatus 200 performs the flowchart of FIG. 5, the system control unit 203 operates in the following manner. In step S504, the system control unit 203 controls the surveillance camera 100 to perform the control according to the image clipping parameter group 403 and not perform the control according to the image quality parameter group 404. Specifically, at this stage, the system control unit 203 transmits a command to perform the control according to the image clipping parameter group 403 to the surveillance camera 100 from the communication unit 204. Here, the system control unit 203 does not transmit a command to perform the control according to the image quality parameter group 404. The system control unit 203 further displays, on the display unit 201, information (for example, a message) indicating that the control according to the image quality parameter group 404 is not performed. After step S504, the control according to the image quality parameter group 404 can be performed at timing when the control according to the image quality parameter group 404 becomes capable of execution (NO in step S502). The same applies to the other exemplary embodiments.

The stream of the partial image generated as described above is received by the communication unit 204 of the client apparatus 200 of the user who has specified the preset parameters 401.

As described above, according to the first exemplary embodiment, whether to perform control according to the image quality parameter group 404 is switched depending on whether another stream is being recorded into a storage. This can give priority to the image quality settings of the stream being recorded, and prevent the image quality parameters from being indiscriminately changed by the execution of the preset function.

Figure 6:
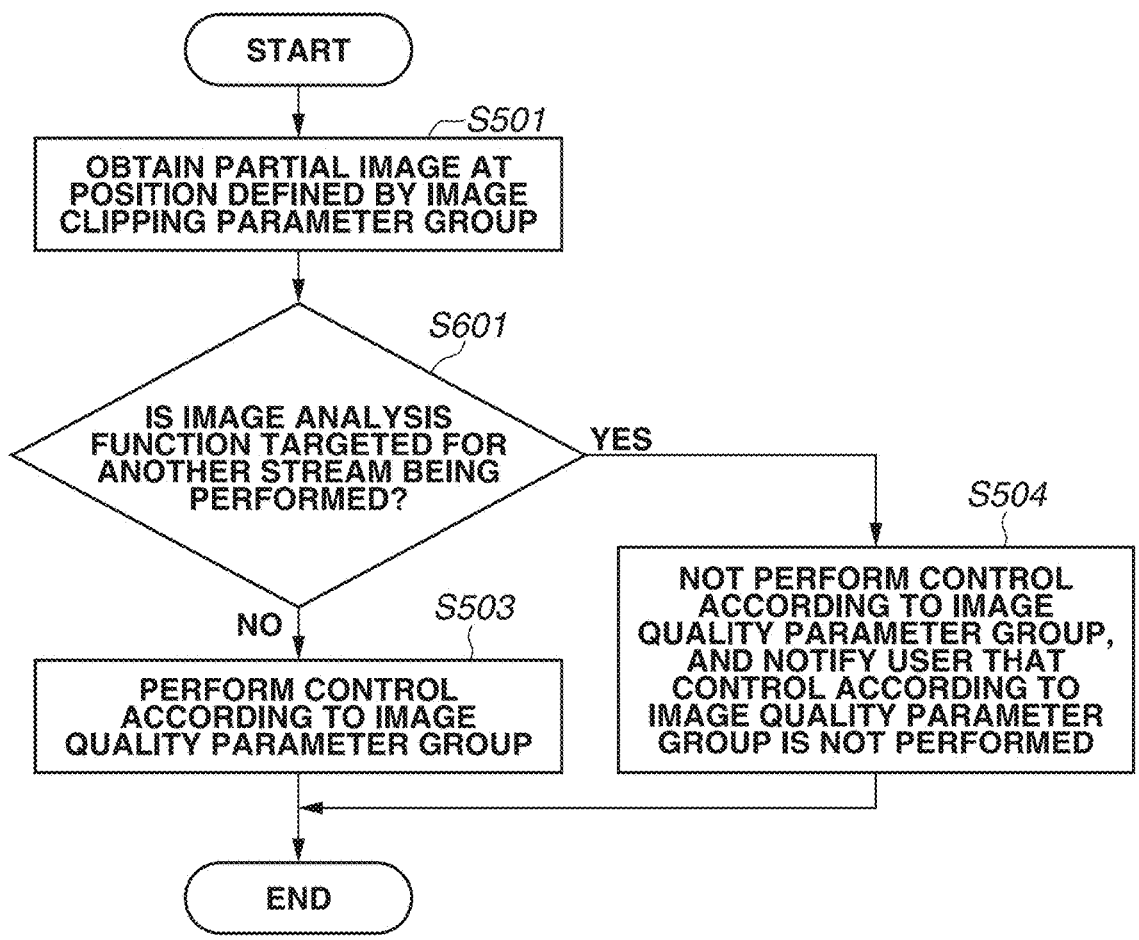
FIG. 6 is a flowchart during execution of a preset function according to a second exemplary embodiment.

A processing flow during execution of the preset function on a stream according to a second exemplary embodiment of the present invention will be described with reference to FIG. 6. A description of parts similar to those of the first exemplary embodiment will be omitted.

In the present exemplary embodiment, the surveillance camera 100 includes an image analysis function of detecting a specific event from an image. For example, the system control unit 103 of the surveillance camera 100 or the system control unit 203 of the client apparatus 200 also functions as an image analysis unit for performing the image analysis function.

For example, the image analysis function is a function of detecting whether a moving body or a specific object (such as a person) is included in the captured image. The image analysis function can be a left object detection function of detecting that a suspicious object is left behind, a carry-away detection function of detecting that an object is carried away, or a tampering detection function of detecting from a captured image that the surveillance camera 100 is tampered.

As a method for image analysis, a background difference method is used. The background difference method includes generating a background image based on a captured image at a point of time in the past or captured images from the past to the present, and performing object recognition based on differences from the current captured image. Various image analysis techniques such as an interframe difference method and pattern matching can be applied to implement various image analysis functions.

The captured image may change abruptly due to a day/night function, infrared lighting, a focus, and an aperture which are image quality parameters included in the preset parameters 401. In such a case, differences from the foregoing background image can increase to cause an erroneous detection. If the captured image changes abruptly, the background image needs to be generated again. The interframe difference method can also temporarily cause an erroneous detection. Then, in the present exemplary embodiment, whether to perform execution for the image quality parameters is determined based on whether the image analysis function is being performed.

A detailed description will be given below. As an example, a processing procedure when preset parameters 401 are specified by operation of the input unit 202 and an execution command for the preset parameters 401 is transmitted from the client apparatus 200 to the surveillance camera 100 will be described. Like the first exemplary embodiment, the flowchart illustrated in FIG. 6 can be performed by the client apparatus 200.

In step S501, when the command is received by the communication unit 107, the system control unit 103 performs control corresponding to the image clipping parameter group 403 of the specified preset parameters 401 on the imaging unit 101 and the image processing unit 102. Specifically, the system control unit 103 obtains a partial image at the position defined by the image clipping parameter group 403. The system control unit 103 then records the obtained partial image in the video recording unit 106 or outputs (transmits) the obtained partial image to the client apparatus 200 via the communication unit 107.

In step S601, the system control unit 103 determines whether an image analysis function targeted for another stream is being performed by at least either one of the system control units 103 and 203. Another stream here refers to the stream of a partial image included in the same captured image (image to be clipped) as the preset parameter-specified stream is. Another stream can be the stream of the image to be clipped.

In a case where no image analysis function targeted for another stream is being performed (NO in step S601), the processing proceeds to step S503. In a case where an image analysis function targeted for another stream is being performed (YES in step S601), the processing proceeds to step S504.

In step S503, the system control unit 103 performs control according to the image quality parameter group 404 of the preset parameters 401.

In step S504, the system control unit 103 does not perform the control according to the image quality parameter group 404 of the preset parameters 401. The system control unit 103 then transmits information indicating that the control according to the image quality parameter group 404 is not performed from the communication unit 107 to the client apparatus 200 for the sake of notification to the user who has specified the preset parameters 401.

As described above, according to the second exemplary embodiment, whether to perform the control according to the image quality parameter group 404 included in the preset parameters 401 is switched depending on the state of execution of an image analysis function targeted for another stream. This can give priority to the image quality settings of the stream under image analysis, and prevent the image quality parameters from being indiscriminately changed by the execution of the preset function.

Figure 7:
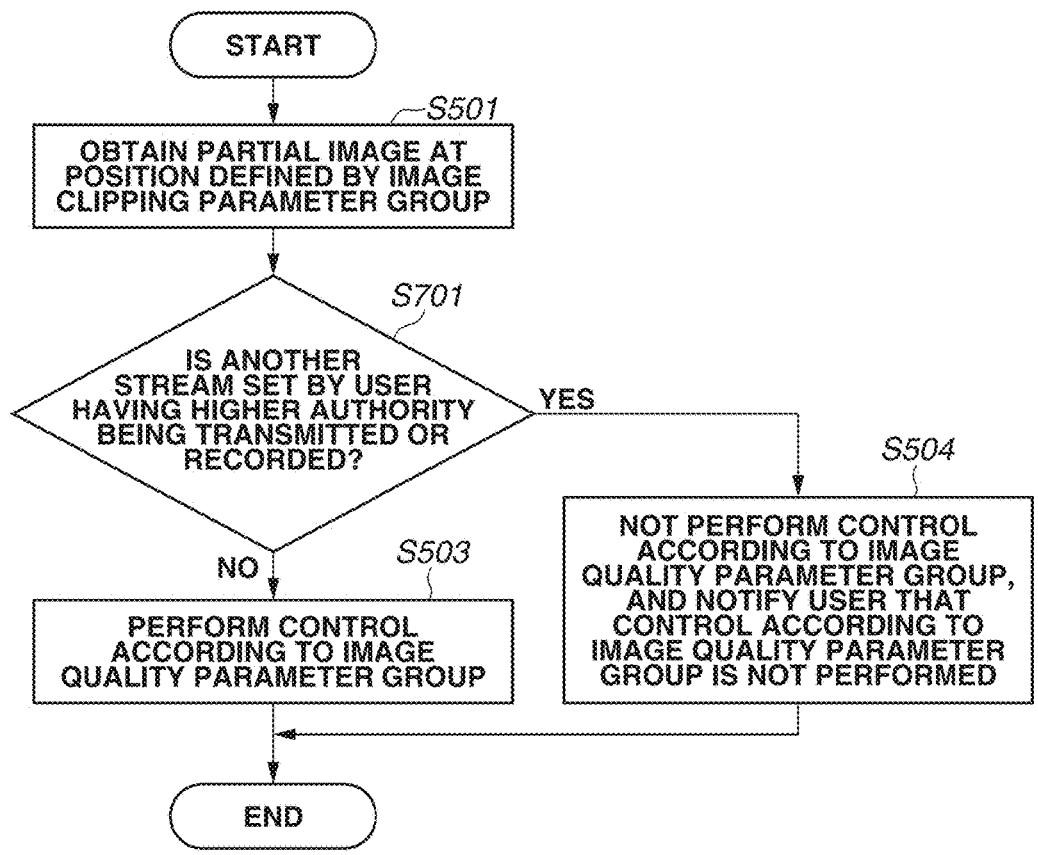
FIG. 7 is a flowchart during execution of a preset function according to a third exemplary embodiment.

A processing procedure during execution of the preset function on a stream according to a third exemplary embodiment of the present invention will be described with reference to FIG. 7. A description of parts similar to those of the first exemplary embodiment will be omitted.

As an example, a processing flow when preset parameters 401 are specified by operation of the input unit 202 and a command to execute the preset parameters 401 is transmitted from the client apparatus 200 to the surveillance camera 100 will be described. Like the first exemplary embodiment, the flowchart illustrated in FIG. 7 can be performed by the client apparatus 200.

In step S501, when the command is received by the communication unit 107, the system control unit 103 performs control corresponding to the image clipping parameter group 403 of the specified preset parameters 401 on the imaging unit 101 and the image processing unit 102. Specifically, the system control unit 103 obtains a partial image at the position defined by the image clipping parameter group 403. The system control unit 103 then records the obtained partial image in the video recording unit 106 or outputs (transmits) the obtained partial image to the client apparatus 200 via the communication unit 107. Since merely obtaining the partial image has no influence on other streams, the control can be performed regardless of the output (transmission) or recording status of the other streams. In other words, the system control unit 103 can perform the control without determining the transmission or recording status of the other streams.

In step S701, the system control unit 103 determines whether another stream set by a user having an authority higher than that of the user of the preset parameter-specifying client apparatus 200 is currently being transmitted (output) or recorded. A user who is set as an administrator has an authority higher than that of a user who is set as a general user. The user having a higher authority refers to a user who can perform more camera controls. Another stream here refers to the stream of a partial image clipped from the same captured image (image to be clipped) as the preset parameter-specified stream is. Another stream can be the stream of the image to be clipped.

In a case where no other stream set by a user having an authority higher than the user of the preset parameter-specifying client apparatus 200 is being transmitted or recorded (NO in step S701), the processing proceeds to step S503. In a case where another stream set by a user having an authority higher than the user of the preset parameter-specifying client apparatus 200 is being transmitted or recorded (YES in step S701), the processing proceeds to step S504.

In step S503, the system control unit 103 performs control according to the image quality parameter group 404 of the preset parameters 401.

In step S504, the system control unit 103 does not perform the control according to the image quality parameter group 404 of the preset parameters 401. The system control unit 103 then transmits information indicating that the control according to the image quality parameter group 404 is not performed from the communication unit 107 to the client apparatus 200 for the sake of notification to the user who has specified the preset parameters 401.

As described above, according to the third exemplary embodiment, whether to perform the control according to the image quality parameter group 404 is switched depending on whether there is another stream set by a user having an authority higher than that of the user of the preset parameter-specifying client apparatus 200. This can give priority to the image quality settings of the stream being transmitted or recorded according to an instruction from the user having a higher authority, and prevent the image quality parameters from being indiscriminately changed by the execution of the preset function.

A processing flow during execution of the preset function on a stream according to a fourth exemplary embodiment of the present invention will be described with reference to FIGS. 8 and 9. A description of parts similar to those of the first exemplary embodiment will be omitted.

Figure 8:
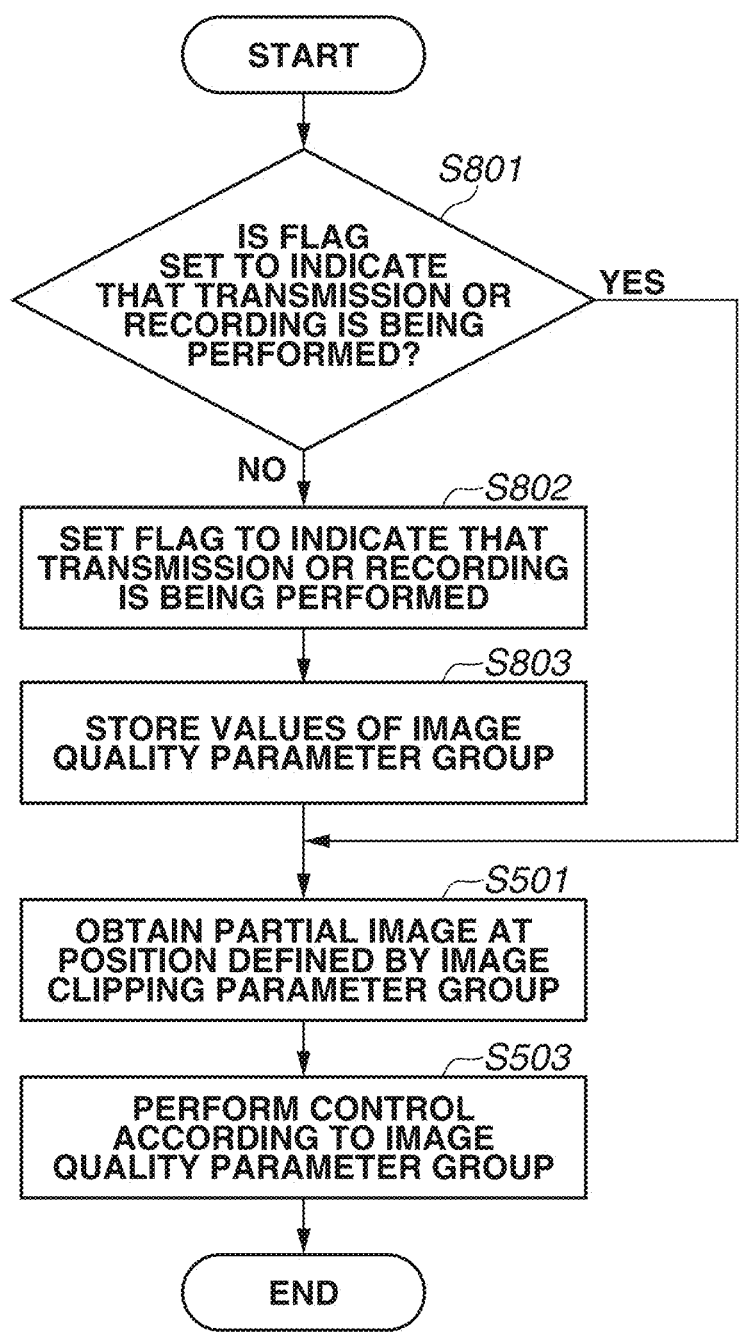
FIG. 8 is a flowchart during execution of a preset function according to a fourth exemplary embodiment.

FIG. 8 illustrates a flowchart when the preset function is performed on a stream according to the fourth exemplary embodiment of the present invention. A case in which preset parameters 401 are specified by operation of the input unit 202 will be described as an example. More specifically, a processing procedure when a command to execute the specified preset parameters 401 is transmitted from the client apparatus 200 to the surveillance camera 100 will be described. Like the first exemplary embodiment, the flowchart illustrated in FIG. 8 may be performed by the client apparatus 200.

In step S801, the system control unit 103, when performing control according to the specified preset parameters 401, determines if a flag that indicates whether transmission or recording of a stream resulting from the specification of the preset parameters 401 is being performed is set to indicate that the transmission or recording is being performed. The control according to the preset parameters 401 here includes control according to an image quality parameter.

In a case where the flag is not set to indicate that the transmission or recording is being performed (NO in step S801), the processing proceeds to step S802. In a case where the flag is set to indicate that the transmission or recording is being performed (YES in step S801), the processing proceeds to step S501.

In step S802, based on the determination result, the system control unit 103 sets the flag to indicate that the transmission or recording is being performed.

In step S803, the system control unit 103 stores the values of the image quality parameter group 404 before the execution of the preset function into a not-illustrated storage unit (the storages mentioned above may be used).

In step S501, like the other exemplary embodiments, the system control unit 103 performs control according to the image clipping parameter group 403 of the preset parameters 401 on the image processing unit 102.

In step S503, the system control unit 103 performs control corresponding to the image quality parameter group 404 of the preset parameters 401 on the image processing unit 102. The content of such controls is similar to that in the other exemplary embodiments.

Figure 9:
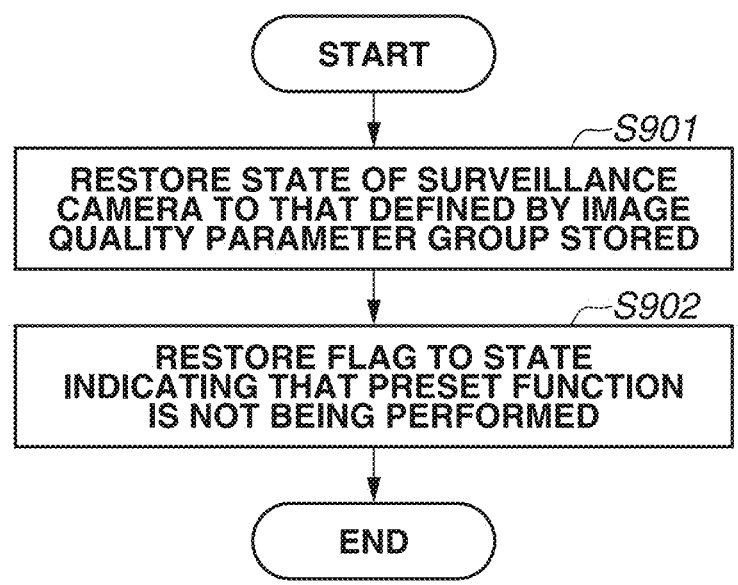
FIG. 9 is a flowchart according to the fourth exemplary embodiment.

If the generation of the stream on which the preset function is being performed is ended (transmission is stopped) after the execution of the preset function as in FIG. 8, the system control unit 103 performs the processing of FIG. 9.

In step S901, the system control unit 103 restores the state of the surveillance camera 100 to that defined by the image quality parameter group 404, stored in step S803. In other words, the system control unit 103 restores the image quality before the execution of the preset function.

In step S902, the system control unit 103 restores the flag set in step S802 to the state indicating that the preset function is not being performed.

As described above, according to the fourth exemplary embodiment, the preset function is performed regardless of the state of other streams. The image quality parameters are controlled during the execution of the preset function. If the target stream on which the preset function is performed is disconnected, the image quality parameters are restored to the state before the execution of the preset function. The image quality parameters can thus be changed only during a period in which the image quality parameters need to be changed, such as in a state where the user is connecting.

A processing flow during execution of the preset function on a stream according to a fifth exemplary embodiment of the present invention will be described with reference to FIG. 10. A description of parts similar to those of the first exemplary embodiment will be omitted.

Figure 10:
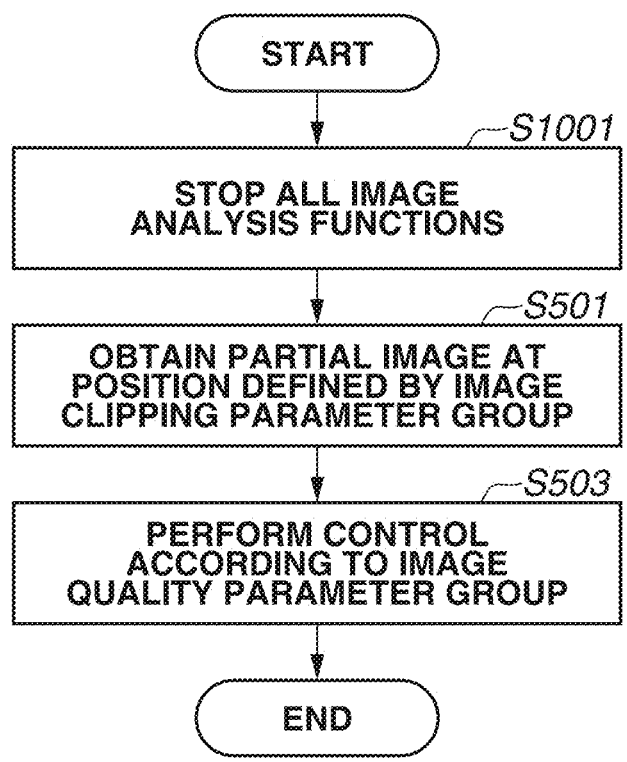
FIG. 10 is a flowchart according to a fifth exemplary embodiment.

FIG. 10 illustrates a flowchart when the preset function is performed on a stream. As an example, a processing procedure of when preset parameters 401 are specified by operation of the input unit 202 and an execution command for the preset parameters 401 is transmitted from the client apparatus 200 to the surveillance camera 100 will be described. Like the first exemplary embodiment, the flowchart illustrated in FIG. 10 can be performed by the client apparatus 200.

In step S1001, the system control units 103 and 203 perform control to stop all image analysis functions being performed by the surveillance camera 100 or the client apparatus 200. As employed herein, all image analysis functions refer to the image analysis functions related to the same captured image as that of the preset parameter-specified image.

In step S501, the system control unit 103 performs control corresponding to the image clipping parameter group 403 of the specified preset parameters 401 on the imaging unit 101 and the image processing unit 102. Specifically, the system control unit 103 obtains a partial image at the position defined by the image clipping parameter group 403. This control is performed regardless of the transmission or recording status of other streams.

In step S503, the system control unit 103 performs control according to the image quality parameter group 404 of the preset parameters 401. Since the image analysis functions are already stopped, this control is also performed regardless of the transmission or recording status of the other streams.

As described above, according to the fifth exemplary embodiment, the processing corresponding to the specified preset parameters 401 is performed regardless of the state of the other streams. When performing the preset function, the system control unit 103 stops the image analysis functions that can be influenced by a change of the image quality parameters, and then performs the preset function. This can give priority to the change of the image quality parameters using the preset parameters 401, and stop unwanted image analysis functions that can cause a lot of erroneous detections due to the change of the image quality parameters.

Next, a hardware configuration for implementing the functions of the exemplary embodiments will be described with reference to FIG. 11. The image processing unit 102, the system control unit 103, and the PTZ control unit 105 of the surveillance camera 100 can be implemented by the hardware configuration illustrated in FIG. 11. The system control unit 203 and the communication unit 204 of the client apparatus 200 can also be implemented by the hardware configuration illustrated in FIG. 11.

A random access memory (RAM) 222 temporarily stores a computer program for a central processing unit (CPU) 221 to execute the computer program. The RAM 222 also temporarily stores data (commands and image data) obtained from outside via a communication interface 224. The RAM 222 provides a work area which the CPU 221 uses in performing various types of processing. The RAM 222 also functions, for example, as a frame memory and a buffer memory.

The CPU 221 executes the computer program stored in the RAM 222. Aside from a CPU, a processor such as a digital signal processor (DSP), or an application specific integrated circuit (ASIC) can be used.

An HDD 223 stores a program of an operating system and image data. The HDD 223 also stores computer programs.

The computer programs and data stored in the HDD 223 are loaded into the RAM 222 and executed by the CPU 221 as appropriate according to the control of the CPU 221. Storage media other than an HDD, like a flash memory, can be used. A bus 225 connects the pieces of hardware. The pieces of hardware exchange data via the bus 225. That is the hardware configuration according to the exemplary embodiments.

An exemplary embodiment of the present invention can be implemented by processing for reading and executing a program for implementing one or more of the functions of the foregoing exemplary embodiments by one or more processors. The program can be supplied to a system or apparatus including the processor(s) via a network or a storage medium. An exemplary embodiment of the present invention can also be implemented by a circuit (such as an ASIC) that implements one or more of the functions of the foregoing exemplary embodiments.

Figure 11:
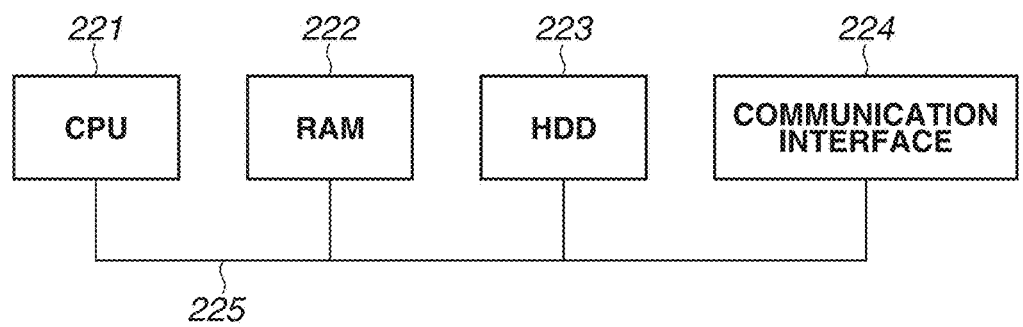
FIG. 11 is a diagram illustrating a hardware configuration of the surveillance camera and the client apparatus according to the exemplary embodiments.

The functional blocks illustrated in FIG. 2 can be implemented by the hardware illustrated in FIG. 11 or by software.

As described above, in the exemplary embodiments, whether the generation of an image according to a condition defined by the preset parameters 401 influences other images is determined. If other images can be influenced, the surveillance camera 100 is controlled to generate an image that satisfies only a part of the conditions (conditions that have no influence) defined by the preset parameters 401. This can prevent the image quality parameters from being indiscriminately changed by the execution of the preset function.

The present invention is not limited to the exemplary embodiments described above, and various changes may be made without departing from the gist of the present invention. For example, combinations of the exemplary embodiments are also covered by the content of disclosure of this specification document.

According to the exemplary embodiments descried above, when a change is made to one of a plurality of images based on the same captured image, the possibility of influencing the other images can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089719, filed Apr. 28, 2017, which is hereby incorporated by reference herein in its entirety.

What is claimed is:

1. A control apparatus comprising:
a determination unit configured, in a case where a definition condition defining a plurality of conditions including an image quality condition for defining image quality of a captured image captured by an imaging apparatus is specified, to determine whether predetermined processing according to a different image is being performed, the different image being different from an image corresponding to the definition condition and being generated by the imaging apparatus; and
a control unit configured, in a case where the definition condition is specified, to control the imaging apparatus to generate an image not satisfying at least part of the conditions defined by the definition condition and satisfying the other condition(s) according to a result of determination by the determination unit.

2. The control apparatus according to claim 1, wherein the control unit is configured, in a case where the predetermined processing according to the different image is being performed, to control the imaging apparatus to generate an image not satisfying at least part of the conditions defined by the definition condition and satisfying the other condition(s).

3. The control apparatus according to claim 1, wherein the control unit is configured, in a case where the predetermined processing according to the different image is being performed, to control the imaging apparatus to generate an image not satisfying the image quality condition and satisfying the other condition(s).

4. The control apparatus according to claim 1, wherein the plurality of conditions includes a position condition defining a position of a partial image, the partial image being an image of a partial area in the captured image captured by the imaging apparatus.

5. The control apparatus according to claim 4, wherein the control unit is configured, in a case where the predetermined processing according to the different image is being performed, to control the imaging apparatus to generate a partial image not satisfying the image quality condition and satisfying the position condition.

6. The control apparatus according to claim 1, wherein the determination unit is configured to determine whether the different image is being recorded in a recording unit.

7. The control apparatus according to claim 1, wherein the determination unit is configured to determine whether an image analysis function targeted for the different image is being performed.

8. The control apparatus according to claim 1, wherein the control unit is configured, in a case where a state of the imaging apparatus is changed such that an image satisfying the image quality condition is generated and when generation of the image has been finished, to restore the state of the imaging apparatus to that before change.

9. The control apparatus according to claim 1, wherein the control unit is configured, in a case where the imaging apparatus is controlled such that an image satisfying the image quality condition is generated, to stop an image analysis function targeted for the different image.

10. The control apparatus according to claim 1, wherein the determination unit is configured to determine whether the different image is an image being output or recorded according to an operation by a user having an authority higher than that of a user specifying the definition condition.

11. The control apparatus according to claim 1, wherein the determination unit is configured to determine whether generation of an image satisfying all the conditions defined by the definition condition influences the different image.

12. The control apparatus according to claim 1, wherein the different image is a partial image clipped from a captured image same as one from which the image is to be generated.

13. The control apparatus according to claim 1, wherein the different image is the captured image including the image to be generated.

14. The control apparatus according to claim 1, wherein the part of the conditions is a condition influencing the other condition(s).

15. The control apparatus according to claim 1, wherein the part of the conditions is the image quality condition.

16. The control apparatus according to claim 1, further comprising an imaging unit.

17. The control apparatus according to claim 1, further comprising a reception unit configured to receive data on the image to be generated.

18. A control method for controlling an imaging apparatus including an imaging unit, the control method comprising:
   determining, in a case where a definition condition defining a plurality of conditions including an image quality condition for defining image quality of a captured image captured by the imaging apparatus is specified, whether predetermined processing according to a different image is being performed, the different image being different from an image corresponding to the definition condition and being generated by the imaging apparatus; and
   controlling, in a case where the definition condition is specified, the imaging apparatus to generate an image not satisfying at least part of the conditions defined by the definition condition and satisfying the other condition(s) according to a result of determination by the determining.

19. A non-transitory recording medium readable to a computer, the recording medium storing a program for causing the computer to function as:
   a determination unit configured to, in a case where a definition condition defining a plurality of conditions including an image quality condition for defining image quality of a captured image captured by an imaging apparatus is specified, determine whether predetermined processing according to a different image is being performed, the different image being different from an image corresponding to the definition condition and being generated by the imaging apparatus; and
   a control unit configured to, in a case where the definition condition is specified, control the imaging apparatus to generate an image not satisfying at least part of the conditions defined by the definition condition and satisfying the other condition(s) according to a result of determination by the determination unit.

* * * * *